United States Patent [19]

Pujare et al.

[11] Patent Number: 4,997,725

[45] Date of Patent: Mar. 5, 1991

[54] ELECTROCATALYTIC OXIDATIVE DIMERIZATION OF METHANE

[75] Inventors: Nirupama U. Pujare, Naperville; Ronald L. Cook, Aurora; Anthony F. Sammells, Naperville, all of Ill.

[73] Assignee: Gas Research Institute, Chicago, Ill.

[21] Appl. No.: 413,526

[22] Filed: Sep. 27, 1989

[51] Int. Cl.$^5$ .............................................. H01M 8/10
[52] U.S. Cl. ......................................... 429/17; 429/33; 429/40
[58] Field of Search ...................... 429/17, 13, 30–33, 429/40, 41, 44, 45

[56] References Cited

U.S. PATENT DOCUMENTS

| | | | |
|---|---|---|---|
| 4,130,693 | 12/1978 | Van Den Berghe | 429/41 |
| 4,137,371 | 1/1979 | Blanchart et al. | 429/41 X |
| 4,459,341 | 7/1984 | Marchant et al. | 429/33 |

Primary Examiner—Anthony Skapars
Attorney, Agent, or Firm—Thomas W. Speckman; Douglas H. Pauley

[57] ABSTRACT

A solid oxide fuel cell and process for direct conversion of natural gas into DC electricity concurrently with the electrocatalytic partial oxidation of methane to $C_2$ hydrocarbon species $C_2H_4$, $C_2H_6$, and minor amounts of $C_2H_2$.

19 Claims, 1 Drawing Sheet

ELECTROCATALYTIC OXIDATIVE DIMERIZATION OF METHANE

BACKGROUND OF THE INVENTION

1. Field of the Invention

Due to the high stability of methane, it has previously been processed through steam reforming steps in routes to desired chemicals. The process of this invention provides the direct synthesis of $C_2$ hydrocarbons, such as ethylene, from methane by partial oxidation by electrocatalytic oxidative dimerization of methane in the anode compartment of a solid oxide fuel cell. The process of this invention using a solid oxide fuel cell is particularly suited for use in conjunction with the direct conversion of natural gas into DC electricity concurrently with the electrocatalytic partial oxidation of the methane to $C_2$ hydrocarbon species $C_2H_4$, $C_2H_6$, and minor amounts of $C_2H_2$.

2. Description of the Prior Art

The complete electrochemical oxidation of methane to $CO_2$ and $H_2O$ in the anode compartment of a solid oxide fuel cell, after its initial steam reformation to hydrogen, has been used in the conversion of natural gas into DC electricity. *Handbook of Batteries and Fuel Cells*, Ed. David Linden, 43-26 to 43-33, published by McGraw-Hill Book Company (1984).

The chemical synthesis of ethylene by oxidative coupling of methane using Sn, Pb, Sb, Bi, Tl, Cd, and Mn oxide catalysts is taught by Keller, G.E., and Bhasin, M.M., "Synthesis of Ethylene via Oxidative Coupling of Methane," *Journal of Catalysis*, 73, 9-19 (1982). However, the Keller, et al. article teaches Li, Mg, Zn, Ti, Zr, Mo, Fe, Cr, W, Cu, Ag, Pt, Ce, V, B, and Al oxides to have little or no such catalytic activity. The chemical synthesis of ethylene directly from methane in the presence of oxygen over LiCl-added transition metal oxide catalysts providing high selectivity and yield is taught by Otsuka, K., Liu, Q., Hatano, M. and Morikawa, A., "Synthesis of Ethylene by Partial Oxidation of Methane over the Oxides of Transition Elements with LiCl", *Chemistry Letters*, The Chemical Society of Japan, 903-906 (1986). Chemical partial oxidation of methane over LiCl—$Sm_2O_3$ catalyst to $C_2$ products, ethylene and ethane, with a high ethylene selectivity is taught by Otsuka, K., Liu, Q., and Morikawa, A., "Selective Synthesis of Ethylene by Partial Oxidation of Methane over LiCl—$Sm_2O_3$," *J. Chem. Soc.*, Chem. Commun., 586-587 (1986). Chemical conversion of methane to ethane and ethylene under oxygen limiting conditions over $La_2O_3$ is taught by Lin, C., Campbell, K.D., Wang, J., and Lunsford, J.H., "Oxidative Dimerization of Methane over Lanthanum Oxide," *J. Phys. Chem.*, 90, 534-537 (1986).

Oxidative coupling of methane over Ag and $Bi_2O_3$—Ag catalysts was carried out with oxygen electrochemically pumped through yttria-stabilized zirconia and it was found that the oxygen pumped to the $Bi_2O_3$—Ag catalyst showed higher catalytic activity and selectivity for the production of $C_2$ compounds compared to surface oxygen from the gas phase. Otsuka, K., Yokoyama, S., and Morikawa, A., "Catalytic Activity—and Selectivity—Control for Oxidative Coupling of Methane by Oxygen-Pumping through Yttria-Stabilized Zirconia," *Chemistry Letters*, The Chemical Society of Japan, 319-322 (1985). Electrochemical driving of $O^{2-}$ species through solid electrolyte yttria-stabilized zirconia decreased selectivity to $C_2$ hydrocarbons and decreases the rate of production of $C_2H_4$ using an Ag-Li/MgO catalyst electrode. Seimanides, S. and Stoukides, M., "Electrochemical Modification of Ag—MgO Catalyst Electrodes during Methane Oxidation," *J. Electrochem. Soc.*, 1535-1536, July, 1986. Rare earth metal oxides $Sm_2O_3$, $Ho_2O_3$, $Gd_2O_3$, $Er_2O_3$, $Tm_2O_3$, $Yb_2O_3$, $Y_2O_3$, and $Bi_2O_3$ have been shown to have good catalytic activity and selectivity in chemical oxidative coupling of methane, $Sm_2O_3$ being the most active and selective catalyst in the formation of $C_2$ compounds. Otsuka, K., Jinno, K., and Morikawa, A., "The Catalysts Active and Selective in Oxidative Coupling of Methane," *Chemistry Letters*, The Chemical Society of Japan, 499-500 (1985).

SUMMARY OF THE INVENTION

This invention provides bifunctional anode electrocatalysts for solid oxide fuel cells utilizing natural gas for the production of DC electricity concurrently with electrocatalytic partial oxidation of methane to $C_2$ hydrocarbon species, predominantly ethylene. The solid oxide fuel cell suitable for use in this invention comprises a metallic oxide oxygen reducing electronic and oxygen vacancy conducting perovskite cathode in contact on one side with an oxygen vacancy conducting solid electrolyte having high $O^{2-}$ conductivity at fuel cell operating temperatures and an anode contacting the other side of the solid electrolyte and comprising a metallic oxide $O^{2-}$ conducting perovskite layer contacting the solid electrolyte and a rare earth metallic oxide layer contacting the opposite side of the anode metallic oxide perovskite layer, the rare earth metallic oxide layer capable of dimerization of methane to predominantly $C_2$ products.

The process for concurrent production of DC current and electrocatalytic oxidative dimerization of methane in the solid oxide fuel cell of this invention includes passing oxygen containing gas in contact with the outside surface of the metallic oxide oxygen reducing electronic and oxygen vacancy conducting perovskite cathode forming $O^{2-}$. The formed $O^{2-}$ is passed from the anode to and through an oxygen vacancy conducting solid electrolyte having high $O^{2-}$ conductivity at fuel cell operating temperatures to the anode contacting the other side of the solid electrolyte. The $O^{2-}$ is passed from the solid electrolyte into an anode having a metallic oxide $O^{2-}$ conducting perovskite anode layer in contact with the solid electrolyte on one side and contacted with $CH_4$ on the other side, the anode oxidatively dimerizing $CH_4$ to $C_2$ species which are predominantly $C_2H_4$. The $C_2$ species and electronics are withdrawn from the anode region.

The anode half-cell electrocatalytic oxidative dimerization reactions may be generally represented by the chemical equations:

$$2O^{2-} + 2CH_4 \rightarrow C_2H_4 + 2H_2O + 4e-$$

$$O^{2-} + 2CH_4 \rightarrow C_2H_6 + H_2O + 2e-$$

$$3O^{2-} + 2CH_4 \rightarrow C_2H_2 + 3H_2O + 6e-$$

The formed ethane may then react at the $O^{2-}$ sites to form additional ethylene. While the exact reaction mechanism is not completely known at this time, it is not likely that unit activity oxygen is formed in the anode compartment. It is believed that the $O^{2-}$ sites within the rare earth metallic oxide anode layer are the key to production of ethylene as the major $C_2$ product.

BRIEF DESCRIPTION OF THE DRAWING

The above and further advantages of this invention will be seen in reading of the description of preferred embodiments together with reference to the drawing wherein.

DESCRIPTION OF PREFERRED EMBODIMENTS

Figure 1:
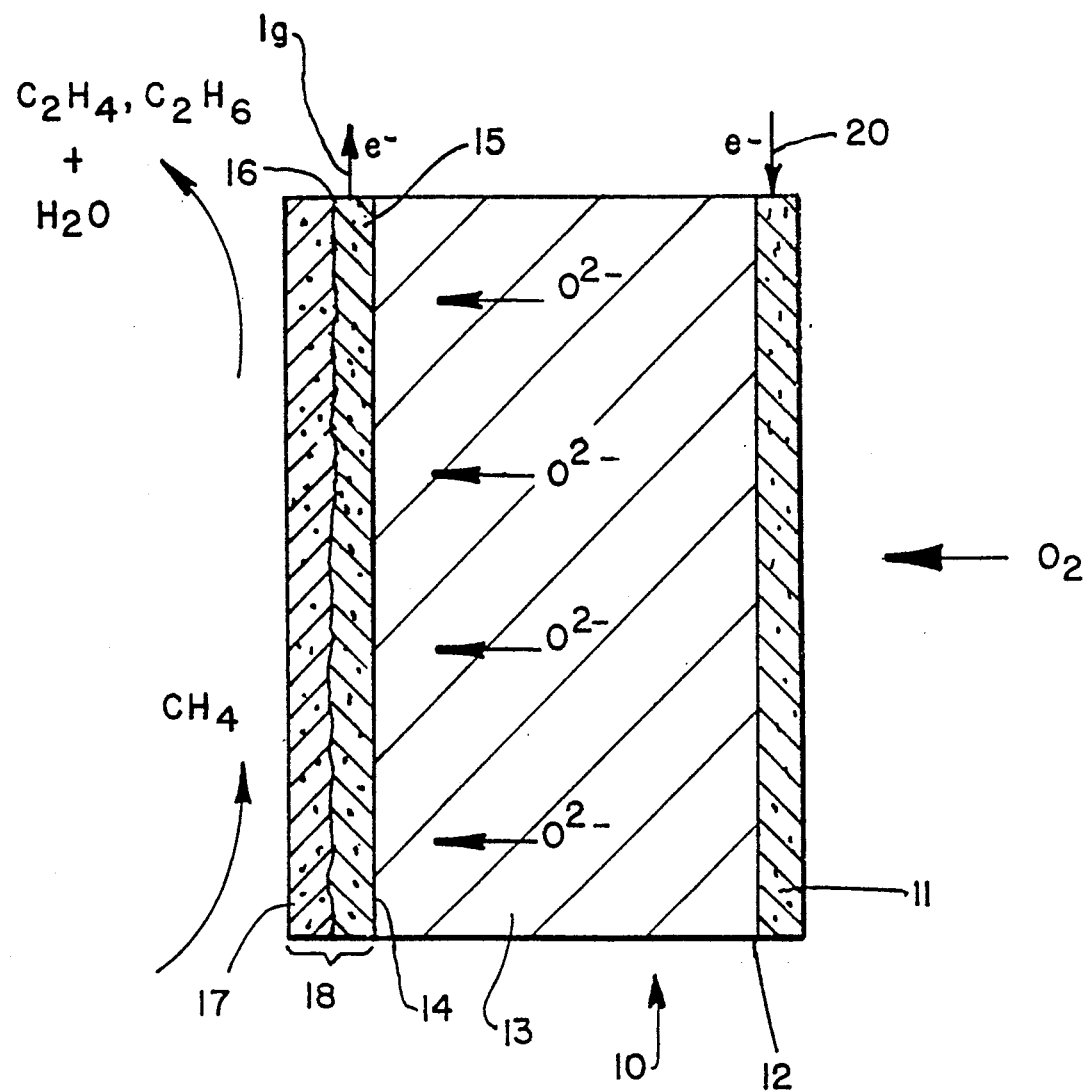
FIG. 1 is a schematic representation of a solid oxide fuel cell according to one embodiment of this invention.

As shown schematically in the drawing, solid oxide fuel cell 10 has a metallic oxide oxygen reducing electronic and oxygen vacancy conducting perovskite cathode 11 contacting oxygen vacancy conducting solid electrolyte 13 through cathode/electrolyte interface 12. The opposite side of cathode 11 is in contact with a cathode compartment for contact with an oxygen containing gas, such as air. Means for supply of the oxygen containing gas and configuration of the cathode compartment are not shown since any such means is suitable and well-known to the art. The oxygen is reduced to $O^{2-}$ in cathode 11 and is passed to and through oxygen vacancy conducting solid electrolyte 13 having high $O^{2-}$ conductivity at fuel cell operating temperatures to the anode/cathode interface 14. Anode 18 has metallic oxide $O^{2-}$ perovskite anode layer 15 on contact through anode/electrolyte interface 14 with electrolyte 13 on one side and on the opposite side through interface 16 with rare earth metallic oxide anode layer 17. Rare earth metallic oxide anode layer 17 is contacted with methane containing gas. The configuration and operation of the anode compartment is not described herein since any suitable means known to the art for contacting the outer surface of anode 18 with methane containing gas and removing formed products from the anode compartment is suitable in the solid fuel cell and process of this invention. Oxygen vacancies, $O^{2-}$, pass from solid electrolyte 13 to anode layer 15 wherein $O^{2-}$ oxidation occurs with rare earth $O^{2-}$ sites being formed at the metallic oxide perovskite anode layer/rare earth metallic oxide anode layer interfacial region 16 providing rare earth $O^{2-}$ sites for partial methane oxidation to $C_2$ species comprising predominantly $C_2H_4$ in rare earth metallic oxide anode layer 17. A suitable current collector and external lead is provided for cathode 11 and anode 18, shown as 20 and 19, respectively, to provide electronic balance to and current withdrawal from the fuel cell.

Suitable materials for cathode 11 are electronic and oxygen vacancy conducting perovskite materials capable of reducing $O_2$ to $O^{2-}$. The cathode may comprise the following perovskite-type materials having the general formula $AMO_3$ where A is La or Pr, M is Co, Ni, or Mn, and O is oxygen; compounds having the general formula $La_{1-x}Ma_xMbO_3$ where La is lanthanum, Ma is Sr, Ca, K, or Pr, and Mb is Cr, Mn, Fe, Co, or Ba, and x is a number about 0.2 to about 0.01, and O is oxygen; compounds having the general formula $LaMcO_3$ where La is lanthanum, Mc is Ni, Co, Mn, Fe, or V, and O is oxygen; and platinum. A preferred perovskite-type material for use as a cathode is strontium doped lanthanum manganite, $La_{0.89}Sr_{0.10}MnO_3$.

Suitable oxygen vacancy conducting electrolyte 13 may comprise the following compounds: Binary $ZrO_2$ based materials having the general formulas $ZR_{1-x}M^{2+}O_{2-x}$ and $ZR_{1-x}M^{3+}O_{2-x/2}$, and ternary $ZrO_2$ based materials such as $ZrO-Y_2O_3-Ta_2O_5$, $ZrO_2-Yb_2O_3-MO_2$, and the like, where M is Ca, Mg, Y, La, Nd, Sm, Gd, Yb, Lu, Sc, Ho, and other materials having similar physical and chemical properties, and M comprises from about 5 m/o to about 20 m/o; $ThO_2$ based materials having the general formulas $TH_{1-x}M^{2+}O_{2-x}$ and $Th_{1-x}M^{3+}O_{2-x/2}$, where M is Ca, Y, Yb, Gd, La, and other materials having similar physical and chemical properties, and M comprises about 5 m/o to 25 m/o; $CeO_2$ based materials having the general formulas $Ce_{1-x}M^{2+}O_{2-x}$ and $Ce_{1-x}M^{3+}O_{2-/2x}$, where M is Ca, Sr, Y, La, Nb, Sm, Eu, Gd, Dy, Ho, Er, Yb, and other materials having similar physical and chemical properties, and M comprises about 5 m/o to 20 m/o; $\delta$-$Bi_2O_5$ based materials having the general formulas $Bi_{2-x}M^{2+}O_{3-x/2}$; $Bi_{2-x}M^{6+}O_{3-x/2}$; and $Bi_{2-x}M_x^{3+}O_3$, where M is Ca, Sr, W, Y, Gd, Dy, Er, Yb, Mo, Cr, and other materials having similar physical and chemical properties, and M comprises about 5 m/o to 35 m/o; $HfO_2$ based materials having the general formulas $Hf_{1-x}M^{2+}O_{2-x}$ and $Hf_{1-x}M^{3+}O_{2-x/2}$, where M is Ca, Sr, Y, and other materials having similar physical and chemical properties, and M comprises about 5 m/o to 35 m/o. Some suitable oxygen vacancy conducting solid electrolytes and their conductivities are as follows:

| | | Conductivity (ohm$^{-1}$cm$^{-1}$) | Measurement Temp. T °C. |
|---|---|---|---|
| $ZrO_2$ | (15 m/o CaO) | $2.4 \times 10^{-2}$ | 1000 |
| $ZrO_2$ | (8 m/o $Y_2O_3$) | $5.6 \times 10^{-2}$ | 1000 |
| $ZrO_2$ | (15–20 m/o MgO) | $(2-4) \times 10^{-2}$ | 1000 |
| $ZrO_2$ | (5–15 m/o $La_2O_3$) | $(2.5-4) \times 10^{-3}$ | 1000 |
| $ZrO_2$ | (15 m/o $Nd_2O_3$) | $(1.4-3.8) \times 10^{-2}$ | 1000 |
| $ZrO_2$ | (10 m/o $Sm_2O_3$) | $5.8 \times 10^{-2}$ | 1000 |
| $ZrO_2$ | (10 m/o $Gd_2O_3$) | $1.1 \times 10^{-1}$ | 1000 |
| $ZrO_2$ | (9 m/o $Yb_2O_3$) | $1.5 \times 10^{-2}$ | 1000 |
| $ZrO_2$ | (15 m/o $Lu_2O_3$) | $1.2 \times 10^{-2}$ | 1000 |
| $ZrO_2$ | (10 m/o $Sc_2O_3$) | $2.4 \times 10^{-1}$ | 1000 |
| $ZrO_2$ | (12.7 m/o $Ho_2O_3$) | $3.5 \times 10^{-2}$ | 880 |
| $ThO_2$ | (7 m/o CaO) | $2 \times 10^{-3}$ | 1000 |
| $ThO_2$ | (15 m/o $YO_{1.5}$) | $6.3 \times 10^{-3}$ | 1000 |
| $CeO_2$ | (10 m/o CaO) | $\approx 10^{-1}$ | 1000 |
| $CeO_2$ | (5 m/o $Y_2O_3$) | $\approx 0.8$ | 1000 |
| $Bi_2O_3$ | (25 m/o $Y_2O_3$) | $\approx 0.3$ | 850 |
| $Bi_2O_3$ | (28.5 m/o $Dy_2O_3$) | 0.14 | 700 |
| $Bi_2O_3$ | (20 m/o $Er_2O_3$) | 1 | 800 |
| $Bi_2O_3$ | (35 m/o $Yb_2O_3$) | 0.14 | 700 |
| $Bi_2O_3$ | (35 m/o $Gd_2O_3$) | 0.22 | 700 |

Anode 18 has metallic oxide $O^{2-}$ conducting perovskite layer 15 contacting solid electrolyte 13 at anode/electrolyte interface 14. Anode perovskite layer 15 may comprise any of the oxygen vacancy conducting perovskite materials set forth above for cathode 11. The perovskite material of the anode may be the same as or different from the perovskite material used in the cathode. Rare earth metallic oxide layer 17 contacts the opposite side of anode metallic oxide perovskite layer 15 at metallic oxide perovskite/rare earth metallic earth oxide interface 16. Suitable rare earth metallic oxides for use in anode layer 17 include: $Sm_2O_3$, $Dy_2O_3$, $Ho_2O_3$, $Yb_2O_3$, $Nd_2O_3$, $Eu_2O_3$, $Er_2O_3$, $Lu_2O_3$, $Gd_2O_3$, $Tm_2O_3$, preferably $Sm_2O_3$ or $Dy_2O_3$.

The electrodes preferably comprise a thin electrode layer deposited on the surface of the oxygen vacancy conducting solid electrolyte. Suitable thin electrode layers may be provided by techniques such as plasma spraying or slurry coating followed by sintering.

Any suitable oxygen containing gas, such as air or oxygen enriched gases, may be provided to the cathode for formation of $O^{2-}$. Likewise, any methane containing gas, such as natural gas, synthetic natural gas, solid or liquid hydrocarbon gasification products containing methane, or methane enriched gases may be supplied to the anode for dimerization.

One preferred solid oxide fuel cell of this invention has the general configuration $CH_4$, $Pt/Sm_2O_3/La_{0.89}Sr_{.10}MnO_3/Pt/ZrO_2(8^w/oY_2O_3)/La_{0.89}Sr_{.10}MnO_3/Pt,O_2(air)$.

Suitable fuel cell operating temperatures according to this invention are about 600° to about 900° C., preferably about 750° to about 800° C.

The following examples are set forth using specific materials and process conditions as exemplary and for a better understanding of the invention and should not be considered to limit the invention.

EXAMPLE I

A solid oxide fuel cell was prepared possessing the general configuration $CH_4$, $Pt/Sm_2O_3/La_{0.89}Sr_{.10}MnO_3/Pt/ZrO_2(8^w/oY_2O_3)/La_{0.89}Sr_{.10}MnO_3/Pt,O_2(air)$. The solid electrolyte was a $ZrO_2(8^w/oY_2O_3)$ closed-one-end oxygen conducting tube. $La_{0.89}Sr_{.10}MnO_3$ oxygen electrodes were initially introduced into both the anode and cathode regions of the fuel cell. These electrodes were prepared by introducing a $5^w/o$ suspension in ethylene glycol/citric acid of $La(C_2H_3O_2)$, $SrCO_3$ and $MnCO_3$ of appropriate composition onto both the outside and inside walls of the yttria stabilized zirconia solid electrolyte tube. For this laboratory cell, platinum wire, 0.25 mm, current collectors were initially in close mechanical contact to both inside and outside walls of this solid electrolyte. Decomposition of the electrocatalyst precursor was achieved by heating the tube assembly to 800° C. in air for 1 hour followed immediately by heating the cell assembly to 1250° C. for 1 hour to form the $La_{0.89}Sr_{.10}MnO_3$ electrodes on each side of the solid electrolyte. In most cases good adhesion was found between the finally sintered electrodes, the solid electrolyte tube and the platinum current collectors. Samaria ($Sm_2O_3$) was introduced as a thin layer suspension in dimethylformamide onto the inside wall electrode anode surface of the fuel cell. Estimated $Sm_2O_3$ loading was 20 mg/cm². The assumption was made that upon subsequent heating of this fuel cell in the atmosphere to $\approx 900°$ C., some limited sintering or solid-state diffusion by $Sm_2O_3$ into $La_{0.89}Sr_{.10}MnO_3$ may occur at their interfacial region. It was anticipated that diffusion by $Sm_2O_3$ into perovskites sites would be localized and not result in significant changes to the bulk properties of these two materials comprising the bifunctional anode.

EXAMPLE II

The cell of Example I was operated with anode fuel gas of 10% $CH_4$ in argon and the cathode oxygen source of air at flow rates of 50 ml/min. The cell was operated at 760° C. under an open-circuit potential of 1.25V. Analysis of anode reaction prducts was performed using a GOW-MAC Model 69-750 FID gas chromatograph using a 6 ft. × ⅛ inch stainless steel column packed with 80/100 mesh Carbosphere (Alltech Associates, Inc.). No $C_2$ species were evident from either the methane or argon sources.

EXAMPLE III

The cell of Example I was then operated under open-circuit potential of initial 1.23V at 760° C. with anode gas composition of 10% $CH_4$ in argon with varying oxygen concentration in the anode gas as shown in Table 1 flowed at 50 ml/min. Methane oxidative dimerization to $C_2$ species, $C_2H_4+C_2H_6+C_2H_2$ was found to be dependent upon oxygen concentration as shown in Table 1.

TABLE 1

| $O_2$ Conc. % | Total $C_2$ Conc. ppm ($C_2H_4 + C_2H_6 + C_2H_2$) |
|---|---|
| 0.25 | 55 |
| 0.60 | 135 |
| 0.90 | 192 |

EXAMPLE IV

The cell of Example I was then operated by passing current through the cell as shown in Table 2 at 760° C. with flow rates of 50 ml/min. of anode gas composition of 10% $CH_4$ and 90% argon and with cathode gas of air. Upon Faradaic transport of $O^{2-}$ through the solid electrolyte from the air cathode to the anode, the total yield of $C_2$ species increased and was linearly related to cell current as shown in Table 2.

TABLE 2

| Total Cell Current, (mA) | Total $C_2$ Species, ppm |
|---|---|
| 10 | 90 |
| 16 | 150 |

$C_2H_4$, $C_2H_6$, and $C_2H_2$ were identified as Faradaic methane oxidative dimerization products with a distribution of 58% $C_2H_4$, 37% $C_2H_6$ and 4% $C_2H_2$. Eleven percent of the Faradaically transported oxygen participated in the methane oxidative dimerization. Anode electrode potentials were always negative of the oxygen electrode potential, hence the Faradaic oxidative dimerization reaction did not rely upon unit activity oxygen being produced in the anode compartment.

While in the foregoing specification this invention has been described in relation to certain preferred embodiments thereof, and many details have been set forth for purpose of illustration it will be apparent to those skilled in the art that the invention is susceptible to additional embodiments and that certain of the details described herein can be varied considerably without departing from the basic principles of the invention.

We claim:

1. A solid oxide fuel cell for electrocatalytic oxidative dimerization of methane comprising;
    a metallic oxide oxygen reducing electronic and oxygen vacancy conducting perovskite cathode; an oxygen vacancy conducting solid electrolyte having high $O^{2-}$ conductivity at fuel cell operating temperatures with one side contacting one side of said cathode; and an anode contacting the other side of said solid electrolyte and comprising a metallic oxide $O^{2-}$ conducting perovskite layer contacting said solid electrolyte and a rare earth metallic oxide layer contacting the opposite side of said anode metallic oxide perovskite layer and capable of dimerization of said methane to predominantly $C_2$ products.

2. A solid oxide fuel cell according to claim 1 wherein said perovskite cathode is selected from the group consisting of materials having the general formula $AMO_3$ where A is selected from La and Pr, M is selected from Co, Ni, and Mn, and O is oxygen; compounds having the general formula $La_{1-x}Ma_xMbO_3$ where La is lanthanum, Ma is selected from Sr, Ca, K, and Pr, and Mb is selected from Cr, Mn, Fe, Co, and Ba, and x is a number about 0.2 to about 0.01, and O is oxygen; compounds having the general formula $LaMcO_3$ where La is lanthanum, Mc is selected from Ni, Co, Mn, Fe, and V, and O is oxygen and platinum.

3. A solid oxide fuel cell according to claim 1 wherein said perovskite cathode is $La_{0.89}Sr_{0.10}MnO_3$.

4. A solid oxide fuel cell according to claim 1 wherein said electrolyte is selected from the group consisting of binary $ZrO_2$ based materials having the general formulas $Zr_{1-x}M^{2+}O_{2-x}$ and and ternary $ZrO_2$ based materials such as $ZrO-Y_2O_3-Ta_2O_5$, $ZrO_2-Yb_2O_3-MO_2$, and the like, where M is selected from Ca, Mg, Y, La, Nd, Sm, Gd, Yb, Lu, Sc, and Ho and M comprises from about 5 m/o to about 20 m/o; $ThO_2$ based materials having the general formulas $Th_{1-x}M^{2+}O_{2-x}$ and $Th_{1-x}M^{3+}O_{2-x/2}$, where M is selected from Ca, Y, Yb, Gd, and La and M comprises about 5 m/o to 25 m/o; $CeO_2$ based materials having the general formulas $Ce_{1-x}M^{2+}O_{2-x}$ and $Ce_{1-x}M^{3+}O_{2-/2x}$, where M is selected from Ca, Sr, Y, La, Nb, Sm, Eu, Gd, Dy, Ho, Er, and Yb and M comprises about 5 m/o to 20 m/o; $\delta\text{-}Bi_2O_5$ based materials having the general formulas $Bi_{2-x}M^{2+}O_{3-x/2}$; $Bi_{2-x}M^{6+}O_{3-x/2}$; and $Bi_{2-x}M_x^{3+}O_3$, where M is selected from Ca, Sr, W, Y, Gd, Dy, Er, Yb, Mo, and Cr and M comprises about 5 m/o to 35 m/o; and $HfO_2$ based materials having the general formulas $Hf_{1-x}M^{2+}O_{2-x}$ and $Hf_{1-x}M^{3+}O_{2-x/2}$, where M is selected from Ca, Sr, and Y and M comprises about 5 m/o to 35 m/o.

5. A solid oxide fuel cell according to claim 1 wherein said anode metallic oxide perovskite layer is selected from the group consisting of materials having the general formula $AMO_3$ where A is selected from La and Pr, M is selected from Co, Ni, and Mn, and O is oxygen; compounds having the general formula $La_{1-x}Ma_xMbO_3$ where La is lanthanum, Ma is selected from Sr, Ca, K, and Pr, and Mb is selected from Cr, Mn, Fe, Co, and Ba, and x is a number about 0.2 to about 0.01, and O is oxygen; compounds having the general formula $LaMcO_3$ where La is lanthanum, Mc is selected from Ni, Co, Mn, Fe, and V, and O is oxygen; and platinum.

6. A solid oxide fuel cell according to claim 1 wherein said anode metallic oxide perovskite layer is $La_{0.89}Sr_{0.10}MnO_3$.

7. A solid oxide fuel cell according to claim 1 wherein said rare earth metallic oxide layer is selected from the group consisting of $Sm_2O_3$, $Dy_2O_3$, $Ho_2O_3$, $Yb_2O_3$, $Nd_2O_3$, $Eu_2O_3$, $Er_2O_3$, $Lu_2O_3$, $Gd_2O_3$, and $Tm_2O_3$.

8. A solid oxide fuel cell according to claim 1 wherein said rare earth metallic oxide layer is selected from the group consisting of $Sm_2O_3$ and $Dy_2O_3$.

9. A solid oxide fuel cell according to claim 1 having the configuration $CH_4$, $Pt/Sm_2O_3/La_{0.89}Sr_{.10}MnO_3/Pt/ZrO_2(8^w/oY_2O_3)/La_{0.89}Sr_{.10}MnO_3/Pt,O_2(air)$.

10. Process for concurrent production of DC current and electrocatalytic oxidative dimerization of methane in a solid oxide fuel cell comprising:
passing oxygen containing gas in contact with one side of a metallic oxide oxygen reducing electronic and oxygen vacancy conducting perovskite cathode forming $O^{2-}$;
passing formed $O^{2-}$ to and through an oxygen vacancy conducting solid electrolyte having high $O^{2-}$ conductivity at fuel cell operating temperatures to an anode contacting the other side of said solid electrolyte;
passing $O^{2-}$ from said solid electrolyte into an anode comprising a metallic oxide $O^{2-}$ conducting perovskite anode layer in contact with said electrolyte on one side and having a rare earth metallic oxide anode layer in contact with said metallic oxide anode layer on the other side and in contact with $CH_4$ containing gas on its other side, oxidatively dirmerizing $CH_4$ to $C_2$ species comprising predominantly $C_2H_4$ and forming $e-$ in said anode; and
withdrawing said $C_2$ species and $e-$ from said anode.

11. Process for concurrent production of DC current and electrocatalytic oxidative dimerization of methane according to claim 10 wherein said oxygen containing gas is air.

12. Process for concurrent production of DC current and electrocatalytic oxidative dimerization of methane according to claim 10 wherein said perovskite cathode is selected from the group consisting of materials having the general formula $AMO_3$ where A is selected from La and Pr, M is selected from Co, Ni, and Mn, and O is oxygen; compounds having the general formula $La_{1-x}Ma_xMbO_3$ where La is lanthanum, Ma is selected from Sr, Ca, K, and Pr, and Mb is selected from Cr, Mn, Fe, Co, and Ba, and x is a number about 0.2 to about 0.01, and O is oxygen; compounds having the general formula $LaMcO_3$ where La is lanthanum, Mc is selected from Ni, Co, Mn, Fe, and V, and O is oxygen; and platinum.

13. Process for concurrent production of DC current and electrocatalytic oxidative dimerization of methane according to claim 10 wherein said perovskite cathode is $La_{0.89}Sr_{0.10}MnO_3$.

14. Process for concurrent production of DC current and electrocatalytic oxidative dimerization of methane according to claim 10 wherein said electrolyte is selected from the group consisting of binary $ZrO_2$ based materials having the general formulas $Zr_{1-x}M^{2+}O_{2-x}$ and $Zr_{1-x}M^{3+}O_{2-x/2}$, and ternary $ZrO_2$ based materials such as $ZrO-Y_2O_3-Ta_2O_5$, $ZrO_2-Yb_2O_3-MO_2$, and the like, where M is selected from Ca, Mg, Y, La, Nd, Sm, Gd, Yb, Lu, Sc, and Ho and M comprises from about 5 m/o to about 20 m/o; $ThO_2$ based materials having the general formulas $Th_{1-x}M^{2+}O_{2-x}$ and $Th_{1-x}M^{3+}O_{2-x/2}$, where M is selected from Ca, Y, Yb, Gd, and La and M comprises about 5 m/o to 25 m/o; $CeO_2$ based materials having the general formulas $Ce_{1-x}M^{2+}O_{2-x}$ and $Ce_{1-x}M^{3+}O_{2-/2x}$, where M is selected from Ca, Sr, Y, La, Nb, Sm, Eu, Gd, Dy, Ho, Er, and Yb and M comprises about 5 m/o to 20 m/o; $\delta\text{-}Bi_2O_5$ based materials having the general formulas $Bi_{2-x}M^{2+}O_{3-x/2}$; $Bi_{2-x}M^{6+}O_{3-x/2}$; and $Bi_{2-x}M_x^{3+}O_3$, where M is selected from Ca, Sr, W, Y, Gd, Dy, Er, Yb, Mo, and Cr and M comprises about 5 m/o to 35 m/o: and $HfO_2$ based materials having the general formulas $Hf_{1-x}M^{2+}O_{2-x}$ and $Hf_{1-x}M^{3+}O_{2-x/2}$, where M is selected from Ca, Sr, and Y and M comprises about 5 m/o to 35 m/o.

15. Process for concurrent production of DC current and electrocatalytic oxidative dimerization of methane according to claim 10 wherein said anode metallic oxide perovskite layer is selected from the group consisting of materials having the general formula $AMO_3$ where A is selected from La and Pr, M is selected from Co, Ni, and Mn, and O is oxygen; compounds having the general formula $La_{1-x}Ma_xMbO_3$ where La is lanthanum, Ma is selected from Sr, Ca, K, and Pr, and Mb is selected from Cr, Mn, Fe, Co, and Ba, and x is a number about 0.2 to about 0.01, and O is oxygen; compounds having the general formula $LaMcO_3$ where La is lanthanum, Mc is selected from Ni, Co, Mn, Fe, and V, and O is oxygen; and platinum.

16. Process for concurrent production of DC current and electrocatalytic oxidative dimerization of methane according to claim 10 wherein said anode metallic oxide perovskite layer is $La_{0.89}Sr_{0.10}MnO_3$.

17. Process for concurrent production of DC current and electrocatalytic oxidative dimerization of methane according to claim lu/wherein said rare earth metallic oxide layer is selected from the group consisting of $Sm_2O_3$, $Dy_2O_3$, $Ho_2O_3$, $Yb_2O_3$, $Nd_2O_3$, $Eu_2O_3$, $Er_2O_3$, $Lu_2O_3$, $Gd_2O_3$, and $Tm_2O_3$.

18. Process for concurrent production of DC current and electrocatalytic oxidative dimerization of methane according to claim 10 wherein said rare earth metallic oxide layer is selected from the group consisting of $Sm_2O_3$ and $Dy_2O_3$.

19. Process for concurrent production of DC current and electrocatalytic oxidative dimerization of methane according to claim 10 wherein said $CH_4$ containing gas is natural gas.

* * * * *